United States Patent [19]

Vasseur et al.

[11] Patent Number: 5,455,950
[45] Date of Patent: * Oct. 3, 1995

[54] UNIVERSAL DEVICE FOR COUPLING A COMPUTER BUS TO A SPECIFIC LINK OF A NETWORK AND OPERATING SYSTEM THEREFOR

[75] Inventors: Marc Vasseur, Paris; Paul Ravaux, Les Clayes Sous Bois, both of France

[73] Assignee: Bull S.A., Paris, France

[ * ] Notice: The portion of the term of this patent subsequent to Nov. 22, 2011 has been disclaimed.

[21] Appl. No.: 913,366

[22] Filed: Jul. 15, 1992

[30] Foreign Application Priority Data

Jul. 15, 1991 [FR] France ............... 91 08907

[51] Int. Cl.$^6$ ............... G06F 9/00; G06F 9/46; G06F 9/06
[52] U.S. Cl. ............... 395/700; 364/DIG. 1; 364/238.3; 364/240; 364/280; 364/281.3; 395/650; 395/309; 395/830; 395/831; 395/843; 395/850
[58] Field of Search ............... 395/200, 775, 395/700, 500, 650, 275

[56] References Cited

U.S. PATENT DOCUMENTS

| | | | |
|---|---|---|---|
| 4,945,473 | 7/1990 | Holtey et al. | 395/200 |
| 5,247,616 | 9/1993 | Berggren | 395/200 |
| 5,367,646 | 11/1994 | Pardillos et al. | 395/325 |

FOREIGN PATENT DOCUMENTS

| | | |
|---|---|---|
| 0278316 | 8/1988 | European Pat. Off. |
| 0342320 | 11/1989 | European Pat. Off. |

OTHER PUBLICATIONS

Holt, R. C., "Concurrent Euclid, The Unix System, and Tunis", 1983, pp. 1–13, 213–297.

Euromicro 88 Symposium on Microprocessing and Microprogramming, vol. 24, Nos. 1–5, Aug. 29, 1988, pp. 503–509.

A. S. Tanenbaum, "Operating Systems—Design and Implementation", 1987, Prentice–Hall, Englewood Cliffs USA.

*Primary Examiner*—Thomas C. Lee
*Assistant Examiner*—D. Dinh
*Attorney, Agent, or Firm*—Kerkam, Stowell, Kondracki & Clarke; Edward J. Kondracki

[57] ABSTRACT

An operating system (GPOS) for universal device (GPU) for coupling a computer bus (PSB) to at least one specific link of a network (RN), the device includes a microprocessor (CPU) associated with at least one memory (SRAM) containing this system and means (MPC, $B_2$, VRAM, $B_1$, DMAC) for transferring frames from the computer bus to the link. The system is associated with a plurality of applications ($A_1$–$A_n$) independent of one another, and includes a central core (NY) managing and organizing the work of each of the applications in real time, an applications manager (GA), which supervises and defines the state each of the applications must be in, and an intercommunications server (SA) for the applications, enabling each of them to request the services of another when that proves necessary. The core, the manager and the intercommunications server communicate between one another via system calls.

3 Claims, 7 Drawing Sheets

UNIVERSAL DEVICE FOR COUPLING A COMPUTER BUS TO A SPECIFIC LINK OF A NETWORK AND OPERATING SYSTEM THEREFOR

CROSS REFERENCE TO RELATED APPLICATION

This application is related to U.S. Pat. No. 5,367,646, filed Jul. 15, 1992, in the names of Jacky Pardillos and Paul Ravaux, assigned to the assignee of the present invention and corresponding to French application 91.08908. The subject matter of said U.S. patent is hereby incorporated by reference.

The present invention relates to an operating system for a universal device for coupling a computer bus to a specific link of a network. In particular, it is applicable to data transmission networks that link together groups of peripherals or terminals, in particular networks in the form of an FDDI-type ring, whose transmission medium is constituted by optical fibers. It is also applicable to a link of the SCSI-type, connecting magnetic disk memories to one another.

FDDI optical fiber networks are well-known and are defined in their broad outlines by the standards worked out by both ANSI (American National Standards Institute) and by ISO (International Standards Organization). The ANSI standard for the FDDI network is X3T9-5.

Similarly, SCSI links are defined by the standards of both ANSI and ISO.

In a network, the information messages output by the various stations are constituted by a plurality of frames, each made up of useful data which are temporally framed by control characters located at the beginning or end of the frames.

It is also known that the set of constituent functional elements of a computer, whether they are processors, memories, or input/output controllers or peripherals, are disposed on a set of boards of standardized dimensions. These boards are generally connected to the same parallel-type bus, assuring communication among the various processors, data transport between the boards, and the electrical supply to the boards.

One bus currently used is the Multibus II (trademark filed by the Intel Corporation), whose architecture is structured around a main bus of the parallel type, commonly known as PSB (which stands for parallel system bus). The Multibus II is standardized to the IEEE (Institute of Electrical and Electronic Engineers) Standard 1296.

Such a computer bus is connected to the specific link of the network (FDDI or SCSI, and so forth) by way of a gateway connection device, whose function is to adapt the information transmission conditions on the Multibus II to the transmission conditions on the network. In fact, the data transmission modes on the PSB bus on the one hand and on the network on the other are completely different, both as to the information transmission rate and as to the transmission particles used, the writing codes, the information, the format, the control characters, the information transmission (parallel on the Multibus II, serial on the FDDI network), and so forth.

Figure 1:
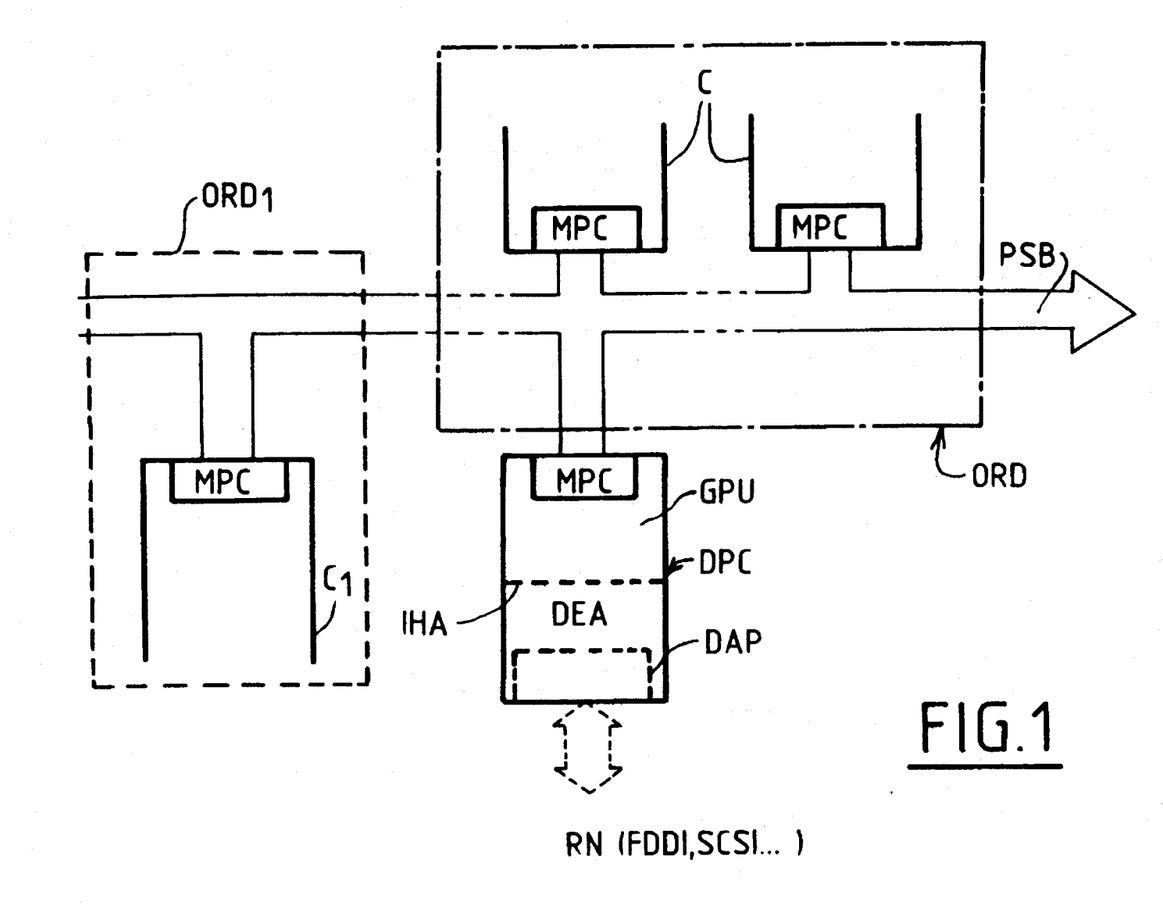
FIG. 1 shows how a computer is connected to a network of any arbitrary type by way of a gateway connection device.

FIG. 1 shows the general structure of such a gateway device, regardless of the type of transmission network.

It shows a computer ORD, whose various constituent elements are disposed on a plurality of boards C communicating with one another by way of the parallel bus PSB. Each board C is connected to the bus by way of an MPC coprocessor, for example an Intel VL 82c389, and communicates by message mode with the other elements of ORD. This communications mode is defined precisely in aforementioned IEEE Standard 1296.

The computer ORD is connected to the network RN, which may be either of the FDDI or SCSI type or of some other type, by way of the gateway connection device DPC. The latter is composed on the one hand of a universal coupling device GPU (for general purpose unit), an adaptor device DEA, and an interface IHA assuring the transfer of information between the device GPU and the adaptor DEA.

The device GPU is connected to PSB via a coprocessor MPC, of the same type as those of the boards C of the computer ORD.

The device DPC is physically connected to the network RN by way of a physical network access device, DAP, which belongs to the adaptor device DEA.

It should be noted that one or more other computers such as $ORD_1$ may be connected to this same bus PSB by way of a coprocessor MPC.

The general structure of the device DPC shown in FIG. 1, and embodiments and the function of the adaptor device DEA, are described in French Patent Application 89 10 156 filed on Jul. 27, 1989 by the present Applicant, entitled "Dispositif passerelle de connexion d'un bus d'ordinateur `a un réseau fibre optique en forme d'anneau" corresponding to U.S. application Ser. No. 07/557,119, filed Jul. 4, 1990 now U.S. Pat. No. 5,074,427 entitled "Gateway Device for Connecting a Computer Bus to a Fiber-optic Token-ring Network". The subject matter of said U.S. application is hereby incorporated by reference.

An embodiment and a preferred mode of operation of the universal coupling device GPU is described in the aforenoted French patent application 91.08908 and its corresponding U.S. Pat. No. 5,367,646 bearing the titles "Dispositif universel de couplage d'un bus d'ordinateur a groupe de peripheriques" and ("UNIVERSAL DEVICE FOR COUPLING A COMPUTER BUS TO A CONTROLLER OF A GROUP OF PERIPHERALS")

Since the operating system (also known as operating software) of the invention is employed by the microprocessor CPU for organizing and managing the functioning GPU, it will be useful to recall here what the essential constituent elements of the latter are, and the broad outlines of its function whose details are explained in the patent application filed by the present Applicant on the same date as the present application, it being understood that the specification thereof is hereby incorporated by reference in the present application.

Figure 2:
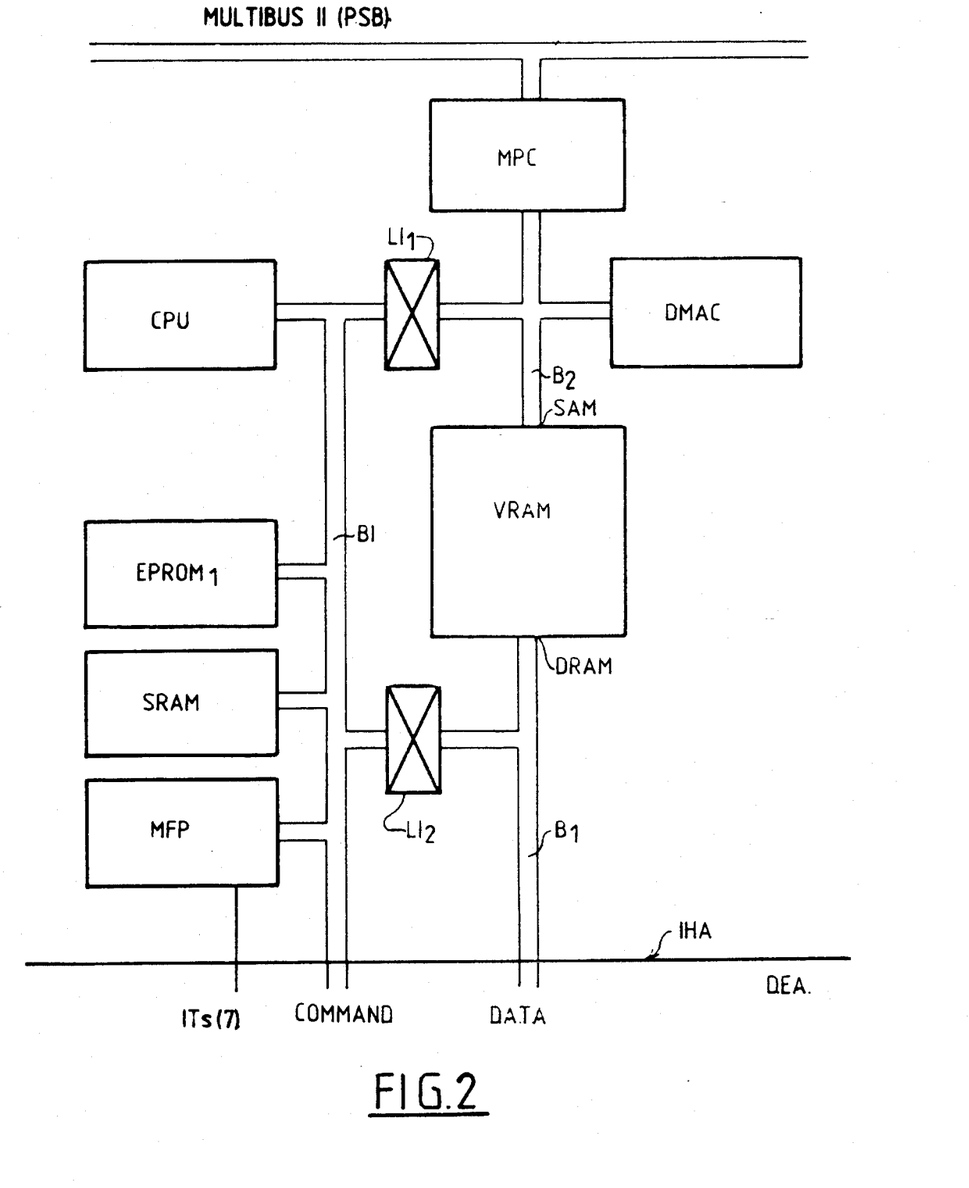
FIG. 2 shows the various essential constituent elements of the hardware structure supporting the operating system of the invention.

Turning to FIG. 2, the interface IHA for transfer between GPU and DEA is represented by a dashed line. It will be recalled that this interface includes a first interface IHAD, allowing transfer of the useful data from or to GPU, and a second interface IHAC, for control blocks including the control characters of the frames received or sent, enabling the transfer of these blocks from or to GPU.

The device GPU includes the following various essential constituent elements:

the coprocessor MPC, which serves as an interface with the bus PSB;

the microprocessor CPU, which in fact is the central processing unit of the device GPU, provided with its internal bus BI and associated with an erasable programmable memory EPROM$_1$, a random access memory SRAM, and an interruption manager MFP, respectively. The elements EPROM$_1$, SRAM and MFP are all connected to the internal bus BI, which is also connected to the interface IHC;

the video RAM double-port memory, represented by the symbol VRAM;

the direct memory access controller DMAC connected to the bus B$_2$ connecting VRAM to the coprocessor MPC;

the bus B$_1$ connecting the memory VRAM to the interface IHAD.

The device GPU also includes a microcontroller, not shown, which has a housekeeping role, for resetting each of the constituent elements of the coupling device to zero and for assuring the function of interconnection of GPU to Multibus II, this function being defined by aforementioned IEEE Standard 1296.

The coprocessor MPC, designed especially to meet the aforementioned IEEE Standard 1296, is of the same type as that described in conjunction with FIG. 1.

In the exemplary embodiment now being described, the microprocessor CPU is of the Motorola 68020 type. This is a 32-bit microprocessor with a clock frequency of 25 MHz. It manages its internal bus BI, which is a non-multiplexed bus with 32 data bits and 32 address bits.

The erasable read-only memory EPROM$_1$, with a capacity of 128 or 256 kilobytes, contains the GPU self-testing and initialization programs.

The operating system of the invention is contained in the static memory SRAM, which has a capacity that equal 512 kilobytes or one megabyte. A protection system is associated with this memory for regulating access to it, and it is described in the aforementioned patent application filed on the same date as the present one.

The operating system, here represented by the symbol GPOS, organizes the operation of the entire microprocessor, and consequently supervises the transfer of frames from the bus PSB to the memory VRAM, and vice versa. In addition, the program for adaptation of the protocols used, on the one hand between the computer ORD and the coupling device via the bus PSB, and on the other in the network RN, is contained in the memory SRAM, for example (it could equally well be contained in the memory EPROM$_1$). Accordingly, the microprocessor CPU is the brain of the coupling device GPU: It initializes the transfer of data, performs protocol adaptation, implements its operating system, and transfers the data between DEA and the computer ORD and vice versa, while being in dialog with DEA, with which it exchanges commands and states, for example in the manner indicated in the aforementioned French Patent Application 89 10156, corresponding to U.S. Ser. No. 07/557,519.

The element MFP (for multifunction peripheral) is what is known as a "peripheral" of the microprocessor CPU. By way of example, it is a Motorola 68901 and is adapted to it by construction. It handles a certain number of functions necessary for the operation of the latter, such as part of the management of the interruptions necessary for it. It also furnishes clock frequencies for the operating system according to the invention. By construction, the 68020 microprocessor has seven levels of interruption, which is not enough to perform all the operations it is tasked with. The element MFP furnishes 16 additional interruption levels in all, eight of them for the CPU and the other eight for external devices (of which seven are for the adaptor device DEA, in a particular embodiment thereof).

The direct memory access controller DMAC assures the transfer of data between the coprocessor MPC and the memory VRAM. (It also assures the transfer of the data making up the operating system and of the associated applications for the memory SRAM, once the operations of initializing of the board carrying GPU are completed. This transfer is done from the disk memories belonging to the computer ORD, for example.)

To perform a data transfer, the controller DMAC receives, from CPU, a starting address (in VRAM or in SRAM), and a count, in other words the number of bytes to be transferred and a starting order for the transfer of data. As soon as it has received this information from CPU, DMAC organizes the transfer.

The video RAM VRAM is a dynamic, double-port memory whose capacity is on the order of one to two megabytes over a width of 32 bits. One of the two ports, that is, SAM, is reserved exclusively for the controller DMAC, while the second port, DRAM, is shared between the microprocessor CPU and the adaptor device DEA. This memory serves as a buffer for the data that pass between GPU and the adaptor device DEA.

From the adaptor device DEA, access to the bus BI is not possible from the bus B$_1$. Any transfer of useful data carried on the bus B$_2$ can similarly not travel over BI. These two impossibilities are symbolized by the existence of the elements FLI$_1$ and FLI$_2$, respectively disposed between the bus B$_2$ and the bus BI, and between the bus B$_1$ and BI. These elements are logical isolation (or inhibition) elements.

The transfer of useful data between the interface IHA and the memory VRAM, on the one hand, and between the latter and the computer PSB on the other, is organized by CPU, this transfer being effected under the control of the controller DMAC, and the conversion of the specific control characters of the protocols used on the bus PSB into those used on the specific link of the network RN, and vice versa, being performed by the microprocessor CPU, which assures their transfer on its internal bus to or from the interface IHA (or IHAC). All the work performed by CPU is supervised and organized in real time by the operating system of the invention, whose object is to make the microprocessor CPU work to the maximum of its capabilities, for the sake of high performance on the part of the device GPU, particularly as to the speed of transfer of the useful data.

According to the invention, the operating system for a universal device for coupling a computer bus to at least one specific link of a network, the device including:

a microprocessor connected by way of its internal bus to at least one memory containing this operating system intended to be run by the microprocessor, means for transferring frames from the computer bus to link and vice versa, whose work is organized and managed by the microprocessor, is characterized in that, being associated with a plurality of applications independent of one another, it includes:
a central core, which in real time manages and organizes the work of each of the applications, when each application is running,
an applications manager, which supervises and defines the state each of the applications must be in,
an intercommunications server for the applications, enabling each of them to request the services of another when that proves necessary,
the core, the manager and the intercommunications server communicating between one another via system calls, the applications communicating with each of these services in the same manner.

Further characteristics and advantages of the present invention will become apparent from the ensuing description, given as a non-limiting example, taken in conjunction with the drawings.

Figure 3:
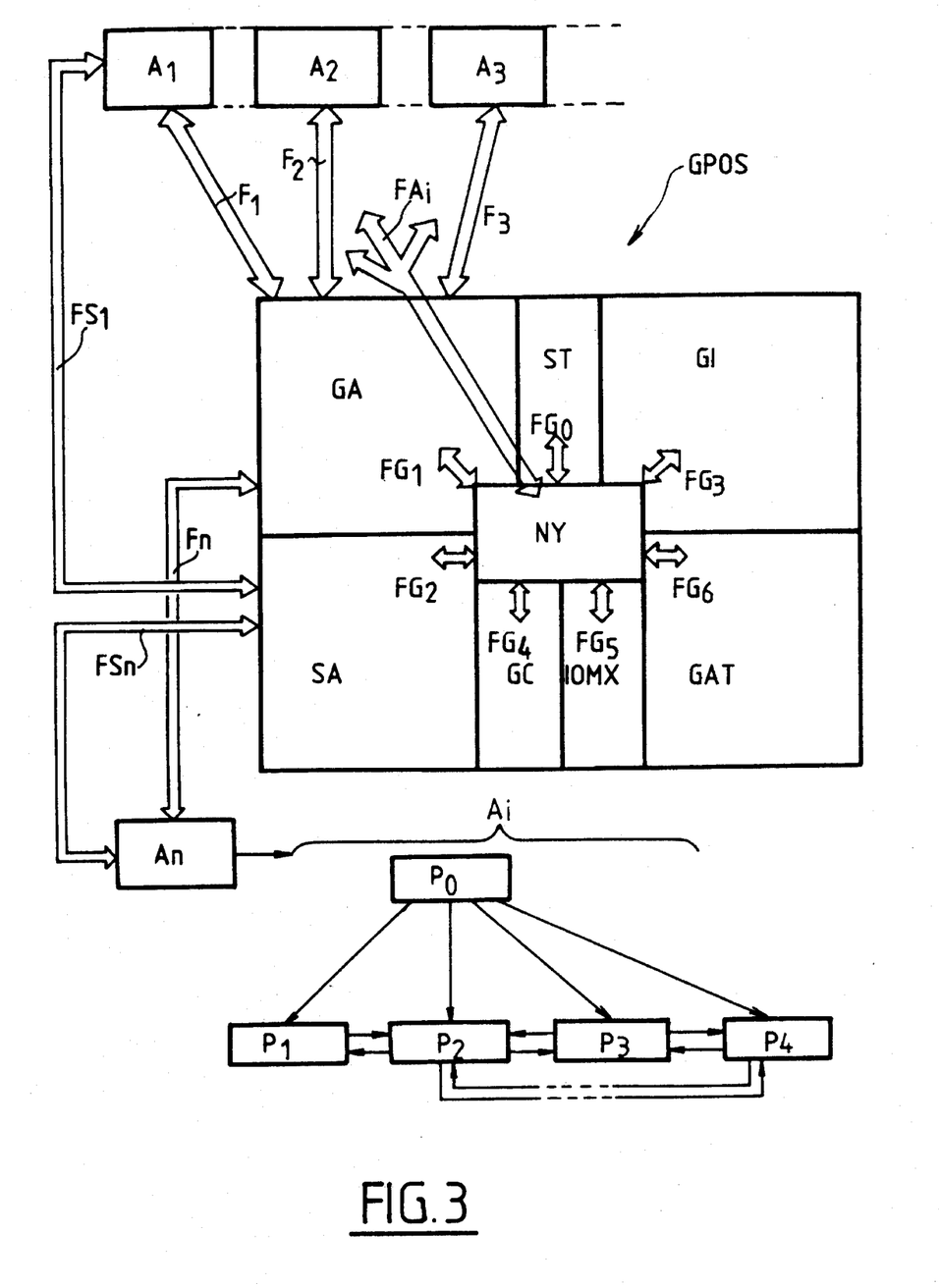
FIG. 3 shows the various essential constituent elements of the operating system of the invention and some of its associated applications.

FIG. 3 shows how the operating system GPOS of the invention is constituted by a central core NY assuring the basic functions of the system, surrounded by a plurality of managers each assuring one specific function. These managers are the applications manager GA, the intercommunications server SA, the fault manager GI, the starter ST, the control manager GC, the terminal access manager GAT, and the interactive debugger IMOX.

Gravitating around the operating system GPOS are applications $A_1, A_2, \ldots, A_i, \ldots, A_n$, which are in fact associated with it; each of these applications communicate and are in dialog with the central core NY and all or some of the managers surrounding it. The applications are autonomous and independent of one another.

The role of each of the constituent elements of the system GPOS of the invention is as follows:

The central core NY performs the basic management of the system, by managing and organizing the work of each of the applications $A_1-A_n$ in real time when the application in question is running. It also performs the management of the various clocks of the system.

The core NY responds to the demands of the managers when the managers request a service, but it takes no initiative whatever. It also manages the activation of the processes making up each of the applications. As a result, the core is a furnisher of services, both for the managers and for the applications.

The applications manager GA supervises and defines the state each of the applications must be in; the definition of these states is described hereinafter in conjunction with FIG. 5.

The intercommunications server SA for applications enables each of the applications to communicate with another one when that proves necessary. As has been noted above, each of the applications is autonomous and independent from one another, so they cannot communicate between (i.e., interact with) one another except by way of this server.

The starter ST initializes the board carrying GPU from the standpoint of its hardware elements. It initializes each of the elements comprising it from the clock standpoint and initializes the management of each of the memories (SRAM, $EPROM_1$, VRAM). The starter also initializes certain structures of the operating system, such as the tables, data, and so forth.

The fault manager GI handles all the operating faults in the system, and in each of the applications and makes it possible either to salvage matters after a fault, or to put a limit on the operation of the application or the system element that is aware of this fault (in this case, it can be said that the fault manager GI aborts the defective system element or application).

The manager for access to a terminal is a manager for debugging the operating system GPOS and the associated applications. It assures connection to any video terminal on which an operator who is debugging the operating system is working. It is remotely associated with the manager IMOX, which more specifically enables communication with the human operator himself.

The operating system GPOS and the set of applications associated with it are too voluminous to be implemented in a PROM-type memory. This is why it is implemented in the random access memory SRAM. When the board carrying GPU is started up, a special program called INIT implemented in the memory $EPROM_1$ is employed as soon as each of the elements of the board has been reset to zero and the function of interconnection with the bus PSB has been effected. This program INIT is tasked with the transfer of the operating system and the associated applications to random access memory SRAM from the disk memories belonging to the computer ORD in which the system GPOS and the applications in question are permanently stored. As soon as the program INIT has completed its job, GPOS and the applications $A_1-A_n$ having been loaded into SRAM, the program INIT becomes inactive and yields to GPOS, and more specifically to the manager ST, which now initializes all the constituent elements of the operating system. This operation of job transfer performed by INIT and the manager ST, respectively, is transparent to any user external to GPU.

The various entities constituting GPOS, and the applications associated with it, can be in dialog with one another by way of what are suitably called system calls. These system calls are used when any entity of the operating system (any application) wishes to call some other structure to accomplish a function (a job) that it does not know how to do. A certain number of parameters precisely defining the function that the entity (or application) in question seeks to have accomplished by some other entity (or application) must always be associated with a system call.

The set of parameters defining the set of functions accomplished by the system (or applications) is arrayed in a special memory zone of SRAM called a stack.

An entity or application in question may then communicate with another one by one or more system calls. This set of calls enabling two entities to communicate with one another is represented by the double-headed arrows in FIG. 3. Thus the entities $A_1, A2, A_3, \ldots, A_n$ communicate with the applications manager GA by way of the sets of monitor calls $F_1, F_2, F_3, F_n$.

The set of applications $A_1-A_n$ communicates with the central core NY by way of the set of calls $FA_i$.

The intercommunications server SA communicates with the application $A_n$ by way of the set of calls $FS_n$, while it communicates with the application $A_1$ by way of the set of calls $FS_1$.

Similarly, the communications between the central core NY and the various respective managers GA, SA, GI, GC, IMOX, GAT, ST take place by way of the sets of system calls $FG_1, FG_2, FG_3, FG_4, FG_5, FG_6, FG_0$.

Thus as been noted above, the applications $A_1$–$AS_n$ are autonomous and independent of one another. They do not require external resources to run. All they need to function is input/output data or commands, these input/output data being furnished by the computer ORD, for example, or by any other boards external to the board that carried GPU, such as another board of the same type, which may be called $GPU_i$, connected to the same bus PSB. Similarly, the commands may be furnished either by the computer ORD or by another board $GPU_i$.

Interference between applications is prohibited, which requires that any error that occurs in one of them be of no significance to the other, and that the data spaces belonging to each of the applications be physically separate in the memory SRAM.

Nevertheless, as has been mentioned above, two applications can be interactive with one another by way of system calls sent to the intercommunications server SA. Thus the two applications $A_1$ and $A_n$ are interactive by way of the two sets of system calls $FS_1$ and $FS_n$ addressed to SA. In that case, the data and commands of one of the applications, such as $A_1$, are sent by the other application, in this case $A_n$. The interaction between each of these two applications $A_1$ and $A_n$ may take place, for example, when $A_1$ asks SA to intervene with $A_n$ in order to furnish it either a service or a particular information, or to participate in the basic service offered by GPOS in its entirety. It is understood that $A_1$ and $A_n$ may be either on the same board GPU or on different boards, such as GPU and $GPU_i$.

Within the operating system, an application is identified by two means, an application number and an application name. It is represented by a special structure called JCB (for job control block). This special structure includes static information, containing the application number and its name, for example, and dynamic information representing the real state of the application, that is, the state it is in at any moment. It goes without saying that this dynamic information varies over the course of time.

It is understood that the applications $A_1$–$A_n$ obey laws of priority that are established and defined by the designers of the applications in question, these priorities being known to the core NY. Certain applications accordingly have higher priority than others.

Figure 5:
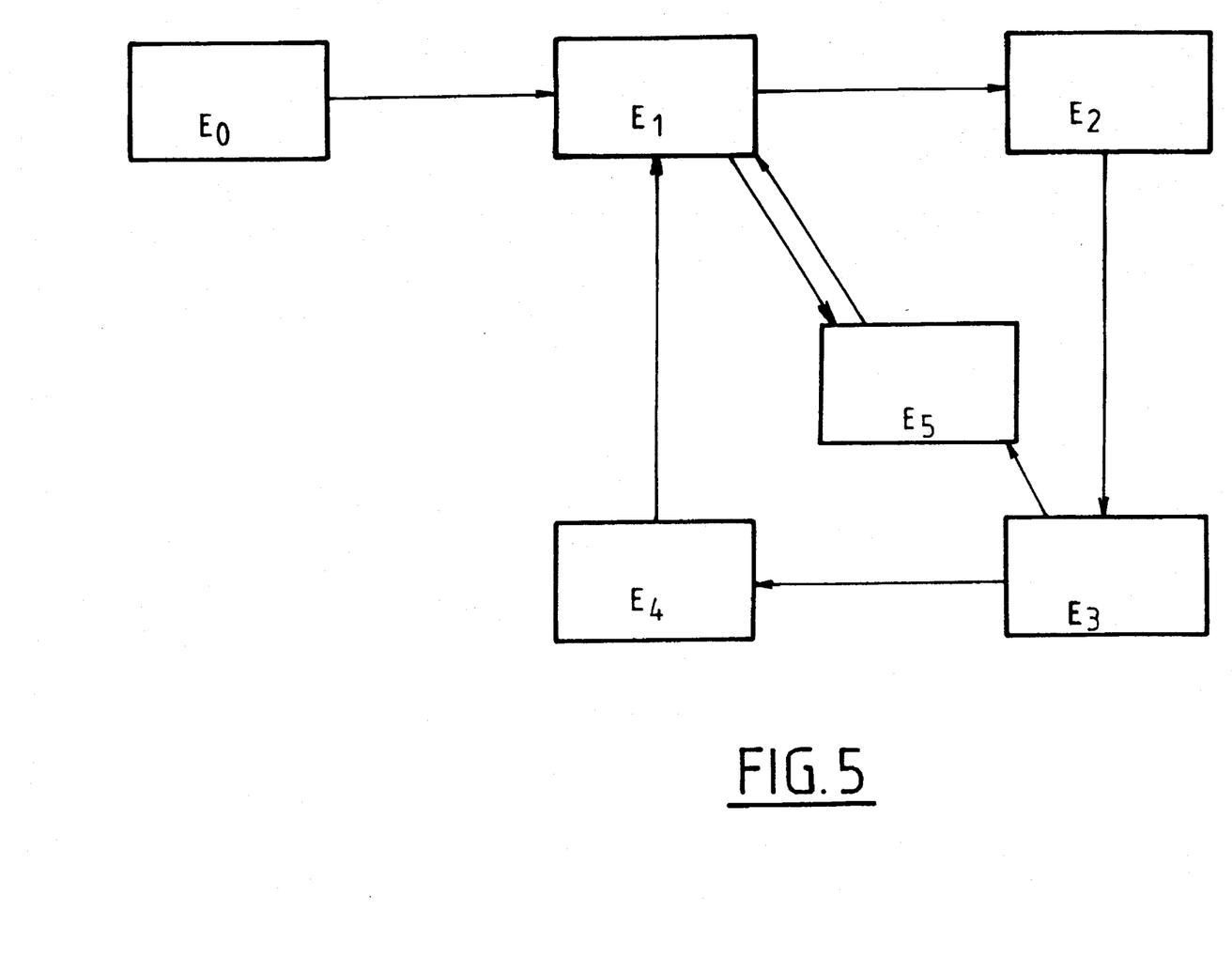
FIG. 5 shows the various states an application may be in, and how a change is made from one state to another.

An arbitrary application may be in one of the states shown in FIG. 5.

The states any arbitrary application may be in are represented by the symbols $E_0$ through $E_5$.

State $E_0$ signifies that the service offered by the application is not available. The application is loaded into the memory SRAM but cannot be used.

State $E_1$ is the state from which the application is started. To this end, the core NY sends a starting order requesting the service of the application, which permits the application to change from state $E_0$ to state $E_1$. This order is called JR (for job request). In state $E_1$, in particular, the operations of initialization of all the processes that constitute the application (see hereinafter) and all the tables corresponding to it in the memory SRAM. In this state, the application does not yet run, and is therefore unstable. Once all the initialization operations and starting of the application have been completed, a change is made to state $E_2$.

State $E_2$ is the most frequent, and this is the one in which the application is running. In this state, the application is capable of furnishing the services requested of it.

State $E_3$ is the state in which the application is being completed or aborted, which happens when the services requested of the application are completed. Once the last operations performed by the last process of the application are completed, a change is made to state $E_4$, the state for which the application is aborted or in other words stopped. A return to state $E_1$ can be made only by a specific order of the applications manager GA, or by an express order of the operator who requests the services of the application (this operator is a human operator, acting by means of a board external to GPU, for example).

There is one additional state $E_5$, in which the application is interrupted by a fault or error. A change from state $E_3$ to $E_5$ can be made when an error or a fault occurs when the application is being completed (state $E_3$). A change is made from state $E_1$ to $E_5$ when the error happens during the operations of startup of the application. A return can then be made from state $E_5$ to state $E_1$ by an order of the operator.

Returning to FIG. 3:

An arbitrary application $A_1$–$A_n$ may be divided into a plurality of processes, each accomplishing a predetermined function. The functions accomplished by each of the processes have no relationship to one another. Inside one application, processes are defined by priorities. They may need to be synchronized (then the processes are said to rendezvous with one another) or to exchange information they need to perform the functions assigned to them. At a predetermined instant, a single process is implemented within CPU when the corresponding application is in the state $E_2$. This is because of the fact that there is only a single CPU in the board GPU. The possible simultaneity of two processes can occur only by logical sequence.

Thus as can be seen from FIG. 3, any arbitrary application $A_i$ is built on the following model. It includes a process $P_0$ for initializing all the elements necessary for the functioning of the application, that is, all the different processes composing it, that is, the processes $P_1$, $P_2$, $P_3$, $P_4$, and so forth, which can communicate with one another.

A process is identified by a process number and an identifier of the application to which it belongs. The process 2.8 will therefore be the process $P_8$ of the application $A_2$.

A process may interact with another one of the same application. When it refers to the latter, it gives its number without the application identifier. This arrangement reinforces the independence and isolation of the applications from one another. In fact, a process can never refer to one of the processes of some other application.

For the operating system GPOS, a process is represented by a special system structure called PCB (for process control block). In the same manner as JCB, PCB includes static information, for example containing the process number and the application identifier, the input points of its own data and its own code in the memory SRAM, and the degree of priority, as well as dynamic information reflecting the real state of the process at the moment when the PCB is read. A PCB has a length of 146 bytes, for example.

Figure 6:
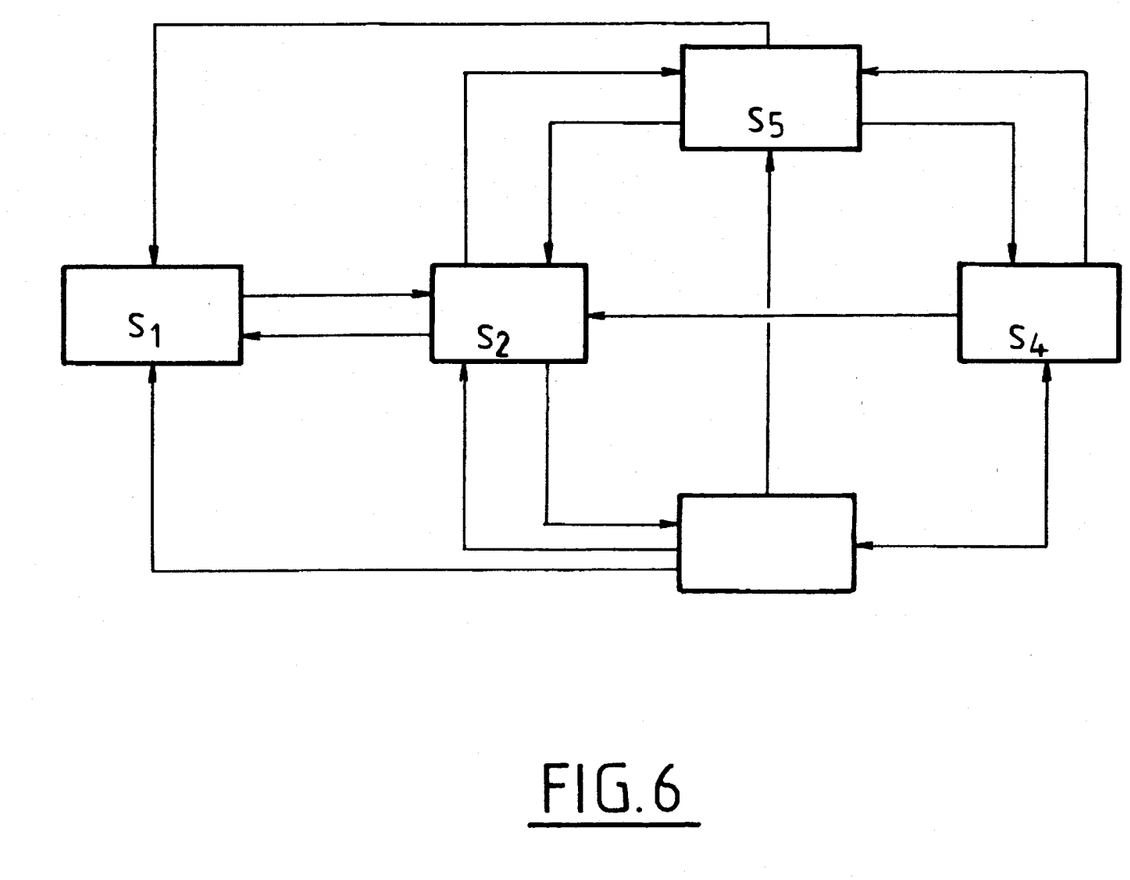
FIG. 6 shows the various states a process of an application can be in, and how a change is made from one state to the other.

The real state of a process is one of the states $S_1$–$S_5$ described in conjunction with FIG. 6.

State $S_1$, called the "dormant" state, is the one in which the process is either aborted or completed or has never been started yet.

State $S_2$ is the "ready" state: This is the state in which the process is ready to become active in the microprocessor CPU. A shift from state $S_1$ to state $S_2$ is made by a starting order, originating in $P_0$, for example, and from $S_2$ to $S_3$ by an abort order originating in the applications manager GA.

State $S_3$ is the "running" state: This is the state in which the process is in the course of running the function it is assigned to accomplish. A change is made from state $S_2$ to $S_3$, or vice versa, by a call from the core (or from the server SA) when the core decides to call the process in question because it has the highest priority, or conversely if the latter no longer has the highest priority. It should be noted in this connection that the operating system coordinates the running of the various processes in an interlaced manner (it also coordinates the running of the various applications $A_1$ to $A_n$ in an interlaced manner) and it uses the level of priority to manage the use of the running time of these various processes. To do so, the operating system, in fact GA, uses special basic mechanisms, called scheduling routines, making it possible at predetermined time intervals to call the process that has the highest priority. These procedures are called by means of either special terminal calls or interruption procedures. A change can also be made from state $S_3$ to state $S_1$ by an abort order originating in GA.

State $S_4$ is the one in which the process waits for an event or data in order to continue to work. In that case, the process does not work, because it is lacking something, such as the data for that purpose. Nevertheless, it is ready to continue its mission as soon as what it is waiting for becomes available. As soon as that happens, the process returns to state $S_3$.

State $S_5$, "suspended": This is the case if the higher authority, represented by the core NY, decides to suspend the jobs of the process, for some reason of its own. A shift can then be made from state $S_5$ to state $S_4$ or from $S_5$ to $S_2$, by order of the same authority that had suspended the process.

Figure 7:
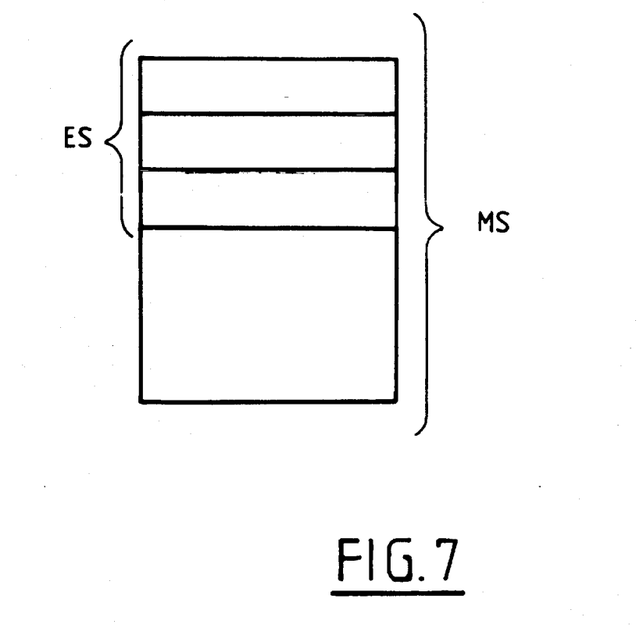
FIG. 7 shows the structure of an event semaphore or of a message semaphore.

Turning now to FIG. 7:

To enable synchronizing the running of two processes or more, or to enable communication between the processes of the same application, the operating system furnishes special tools, of a known type, which are called semaphores. Depending on the use that is to be made of them, that is, process synchronization or interprocess communication, there are two types of semaphores: token semaphores, also called event semaphores, and message semaphores. The token semaphores are represented by the symbol ES, and the message semaphores by MS.

These semaphores have a similar structure, except that the message semaphores are longer.

As can be seen in FIG. 7, both the ES and MS semaphores initially include a heading, which for the semaphore MS in particular defines the type of message. The semaphore includes the code of the action to be accomplished, that is, the type of action to be accomplished with it, hence to remove or insert a token for an event semaphore, or to post or remove a message for a message semaphore MS.

The message semaphore MS also includes one portion that may contain a text. This text is the product of an agreement between the parties who are exchanging the message. It may be either data, or data addresses, and so forth.

Any arbitrary semaphore is identified by a semaphore number and an application identifier. These identification data are contained in the heading of the semaphore.

A given semaphore belongs to a well-defined application. An operation on this semaphore can be accomplished uniquely by the process of the application to which the semaphore belongs. When a process refers to a semaphore, it identifies it uniquely by its semaphore number, without the application identifier, which this same process does not possess. This arrangement reinforces the isolation between applications, since a process can never have access to the semaphore of some other application. On the contrary, any process of a predetermined application can have access to any semaphore of this same application at any moment. More than one process may be waiting for access to the same semaphore at the same moment.

As for the message semaphores, it is well to recall that the processes run practically autonomous functions. However, any process may need at any moment to exchange information or receive information from the outside world, either from another application or from GPOS. The function of the message semaphores is precisely to permit the processes of the same application to exchange information, or to exchange information with the outside world (in the latter case, the information proceeds by way of SA, as noted above).

When an application is being run, it may be subject to error, or to some arbitrary kind of problem not foreseen in the progress of this application. To this end, the operating system GPOS includes the fault manager GI, whose purpose is troubleshooting this application for error or recognizing a problem. Any error or problem is counted as an exception. Three categories of them can be distinguished, that is:

An exception concerning a process: Such an exception generally leads to aborting of the process in course.

An exception for an application: This application, not linked to a process, generally leads to aborting of the application. This is true, for example, when trouble occurs during the execution of a special interruption management routine (it will be recalled that CPU manages a certain number of interruptions).

An exception for the system: This involves an extremely major error, which is not associated with a particular application and which leads to crashing of the system.

When an exception occurs, a message making a report on this exception is constructed and stored, either in PCB for a process exception or in JCB for an applications exception, or in a special zone of the operating system GPOS, if a system exception is involved.

The general format of an exception message includes first a specific heading for that message, containing in particular the general indication of this message, such as whether it is an exception for a process or an exception for an application, and so forth. This heading is followed by information concerning the type of exception within the exception category and identifying the entity that recognizes this exception. This information is then followed by specific information as a function of the type of error, and giving the zone where the error is located, for example, and so forth.

Figure 4:
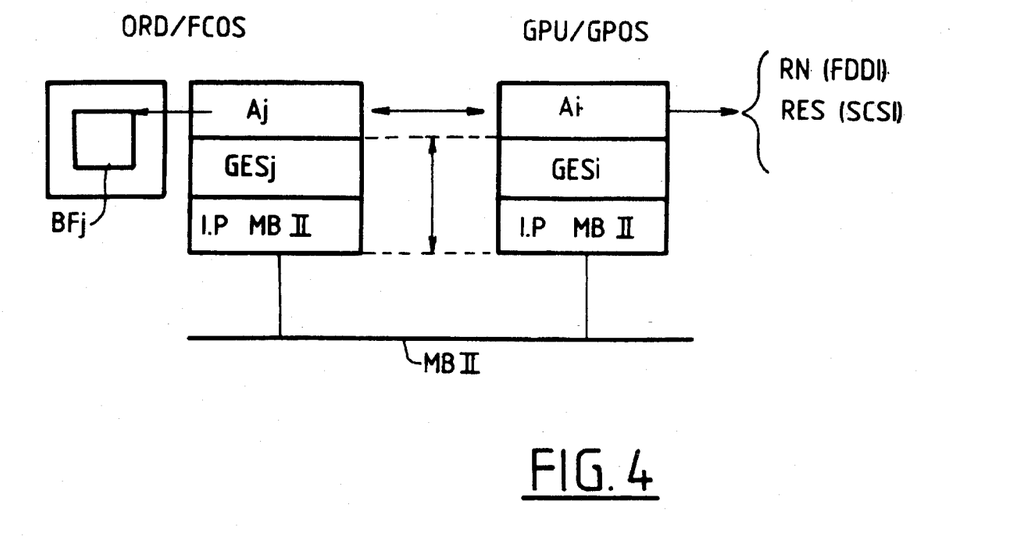
FIG. 4 illustrates the general context, in terms of layers, in which the action of the operating system of the invention takes place.

Turning now to FIG. 4, a concrete example of context in which an application $A_i$ works is shown; the application organizes the transfer of data from the Multibus II to a network RN, or vice versa, and this network RN can be defined by a link of the FDDI or SCSI or Ethernet type.

If the functions employed by GPU under the control of its operating system GPOS are considered as a form of conventional stacking of layers, then in succession, from the highest layer to the lowest, there are the application $A_i$, the input/output management $GES_i$, and the physical interface Multibus II, the latter being defined by the aforementioned IEEE Standard 1296.

For the computer ORD, working under the control of its operating system, such as the GCOS7 made by BULL S.A., an operating system used for example in the DPS7000 computer also made by BULL, the succession from top to bottom is the application $A_j$, the input/output manager $GES_j$, and the physical interface Multibus II, which is analogous to that located on the board GPU. The set of the two layers constituted by the physical interface Multibus II and the input/output manager, whether it is $GES_j$ or $GES_i$, is known by the protocol named PLANET, developed by the present Applicant and described in French Patent No. 2 633 414, filed by the present Applicant and entitled "Systeme informatique `a interconnexion centrale" [Information Processing System with Central Interconnection], for which the corresponding U.S. patent application is Ser. No. 07/369, 333, Now U.S. Pat. No. 5,245,703. The subject matter of said U.S. application is incorporated herein by reference.

The application $A_j$ consists in either constituting a plurality of frames, in a special memory zone $BF_j$ of the computer ORD, that are to be sent to a network RN of the FDDI type, for example, or in simply preparing a special empty memory zone $BF_j$ intended to receive frames originating from RN. These special memory zones $BF_j$, $BF'_j$ are called buffers. $A_j$ gives the input/output manager $GES_j$ the addresses and the lengths of these buffers and at the same time constitutes command blocks intended for $A_i$. These command blocks consist in indicating to $A_i$ that it is supposed to perform a transfer of data from $BF_j$ to RN, or to fill $BF_j$ with the data originating in RN. These command blocks are also transmitted to $GES_j$. The input/output manager $GES_j$ accepts these data and command blocks, constitutes frames in accordance with the protocol PLANET, and sends them over the Multibus II. On arrival at GPU, the frames established by this latter protocol are handled by the operating system, at the level of the server SA which knows the PLANET protocol. Once SA has placed the useful data of the frames in question into the memory VRAM and has placed the command blocks in SRAM (see the aforementioned French patent application filed on the same date as the present application), it then reactivates the application $A_i$ in question. The application then handles the sending of these useful data to the network RN or to ORD.

Figure 8:
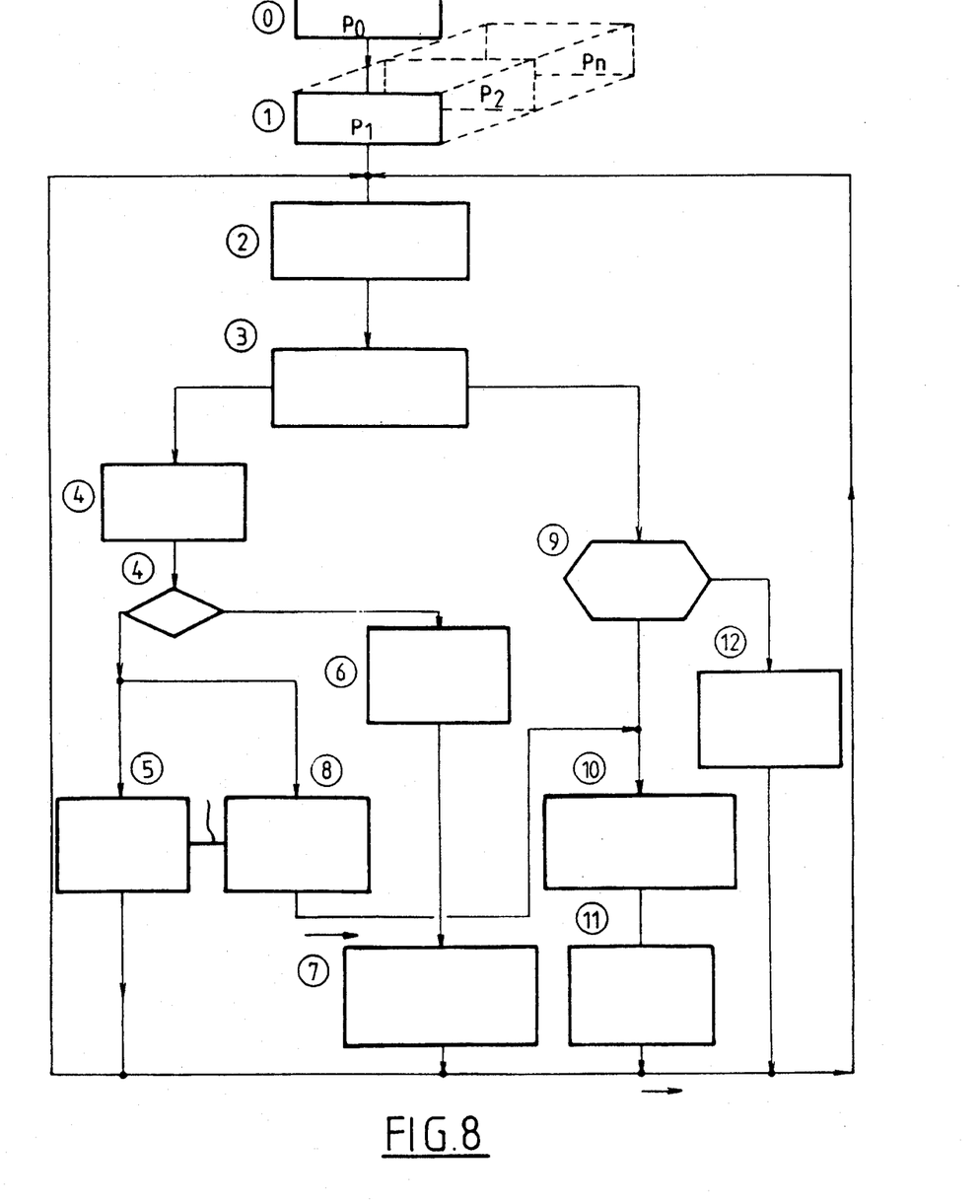
FIG. 8 is a flowchart showing the various stages in operation of a particular application for transferring the frames, under the control of the operating system, from the computer bus to the network and vice versa.

More precisely, the way in which the useful data are sent from the computer ORD to the network RN and vice versa is illustrated by the flowchart in FIG. 8.

The successive operations in the latter are as follows:

0: The core NY reactivates the application $A_i$ and then starts the process $P_0$, also called INIT. As explained above, this process initializes the application and consequently a number of tables that belong to it. It then initializes the adaptation device DEA.

One now proceeds to operation 1.

1: The process INIT then starts the first process $P_1$. In the exemplary embodiment described here, the application $A_i$ is composed of the processes $P_0$ and $P_1$. In the case where the application has a higher number of processes, in this operation 1, the various processes $P_1$, $P_2$, . . . , $P_n$ are started one after another. Once $P_1$ has started, the application $A_i$ is in state $E_2$ (running). It remains in this state so as to then process all the frame transfers, by either transmission or reception. The corresponding process $P_1$ is in state $S_2$ (ready). It should be noted that in the case where there are n processes in $A_i$, they can be started either by $P_0$ or by one of them; the starting of the processes is concatenated in any arbitrary, random order.

One then proceeds to operation 2.

2: At a predetermined instant, GPOS (SA) receives a request for service from the computer ORD. SA then looks in the computer ORD for what is requested of it and then seeks the resource suitable to it for accomplishing this service. This resource is in fact the application corresponding to $A_i$, or in other words $A_j$, which will look in the buffer $BF_j$ for the frames intended to be sent to the network RN. SA then knows that it needs to employ the application $A_j$, and it then posts the message in the corresponding semaphore for that application and then yields to the application: It reactivates it.

One then proceeds to operation 3.

3: The process $P_1$ then analyzes the semaphore and draws conclusions from it, requesting who the initiator of the operation it; is it the adaptor device DEA, or the computer ORD? If the former, then one proceeds to operation 9; if the latter, one proceeds to operation 4.

4: $P_1$ then demands the order that comes from ORD to SA, which is to look into the memory of ORD: Is it a reading operation or a writing operation? If it is a reading operation, then one proceeds to one of the two operations 5 and 8. If it is a writing operation, one proceeds to operation 6.

5: In this operation, the computer ORD indicates to the device CPU that it is ready to receive the data originating in the network RN. If there are no available data originating in the network, then one moves from operation 5 to operation 2.

8: In this operation, a check is made whether the data originating in DEA, or in other words the network RN, are available. If no datum is available, then one proceeds to operation 5. If the data are available one proceeds to operation 10.

10: A dialog then begins between the application, or specifically between its process $P_1$, and the adaptor device DEA to locate these data (DEA knows where these data are) in the memory VRAM. As for this dialog, reference can be made first to the aforementioned French Patent Application 89 10156, for which the corresponding U.S. patent application is Ser. No. 07/557,119, U.S. Pat. No. 5,074,427 and to the French patent application 91.08908 and its U.S. equivalent filed on the same date as the present application. As soon as this dialog is completed, one proceeds to operation 11.

11: In this operation, $P_1$ requests the applications server SA to write the data that have been stored in VRAM in the buffer allocated for that purpose in the computer ORD, or in other words $BF_j$. To do this, SA uses the protocol PLANET. A return is then made to operation 2.

6: SA has given $P_1$ the order to write the data (see 4). The latter then requests the data from SA that it is supposed to write. SA then looks for the data, which are in the buffer $BF_j$, by dialog with ORD, using the protocol PLANET. These data are then stored in the memory VRAM. One can then pass to the following operation, 7.

7: Here dialog takes place between $P_1$ and the adaptor device DEA, in the manner indicated in the aforementioned two patent applications, for transmitting the data to the network RN by way of the interface IHA and the device DEA. Once the data have been retrieved from VRAM and are in the network RN, one returns to operation 2.

If the adaptor device DEA, in response to the analysis made in operation 3, is designated as the initiator, then one proceeds to operation 9:

9: $P_1$ verifies whether the computer ORD is ready to receive the data. If that is not the case, one proceeds to operation 12, where the data are available in the memory VRAM (from 12, one returns to 2).

If the computer ORD is ready to receive the data, then one proceeds to operation 10, already described.

We claim:

1. A universal device for coupling a computer bus of a computer to a controller of a group of peripherals connected to one another by a specific link to which the controller is physically connected, said universal device comprising:
- a memory;
- a microprocessor connected to the memory, said microprocessor having an operating system associated therewith;
- a controller interface for linkage with the controller and enabling transfer of data defining frames and control blocks;
- a double-port random-access buffer memory connected by a first bus to said controller interface and by a second bus to the computer bus via a specific interface of the computer;
- means for organizing transfer of data by the microprocessor between said controller interface and the double-port memory, and between the double-port memory and the computer bus;
- a direct memory access controller operatively connected between said double-port memory and the computer, said transfer of data being effected under control of said direct memory access controller, wherein conversion of control blocks of protocols used on the computer bus into those used on the link and vice versa is performed by the microprocessor, which enables a transfer of control blocks used on the link over an internal bus of the microprocessor to or from said controller interface;
- said operating system being associated with a plurality of applications independent of one another, wherein said operating system includes: a central core for managing and organizing the work of each of the applications in real time, when each application is running;
- an applications manager for supervising and defining an operational condition for each of the applications;
- an intercommunications server for enabling each of said applications to request the services of another of said applications when necessary;
- means for establishing intercommunication between the central core, the applications manager and the intercommunications server via system calls; and
- means for enabling said applications to communicate with each of the services provided by said central core, said applications manager and said intercommunications manager via monitor calls.

2. The universal device of claim 1, wherein every first application can interact with a second application by way of the intercommunications server, by sending the latter a first set of system calls for providing communication between the first application and the intercommunications server, the server then sending a second set of system calls to the second application for providing communications between the intercommunications server and the second application.

3. The universal device of claim 1, wherein each application is represented by an information structure including static information enabling its identification, and dynamic information having the real time state of the application at a predetermined moment.

* * * * *